Nov. 24, 1942.   F. L. EIDMANN ET AL   2,303,115
SELF-SYNCHRONIZING SYSTEM
Filed June 21, 1939   3 Sheets-Sheet 1

INVENTORS.
Frank L. Eidmann
George C. Engel
Adolph Amend, Jr.
BY
ATTORNEY.

Nov. 24, 1942.    F. L. EIDMANN ET AL    2,303,115
SELF-SYNCHRONIZING SYSTEM
Filed June 21, 1939    3 Sheets-Sheet 2

INVENTORS.
Frank L. Eidmann
George C. Engel
Adolph Amend, Jr.
BY
*H. H. Hulse*
ATTORNEY.

Nov. 24, 1942.   F. L. EIDMANN ET AL   2,303,115
SELF-SYNCHRONIZING SYSTEM
Filed June 21, 1939    3 Sheets-Sheet 3

INVENTORS.
Frank L. Eidmann
George C. Engel
Adolph Amend, Jr.
BY
*H. H. Hulse*
ATTORNEY.

Patented Nov. 24, 1942

2,303,115

UNITED STATES PATENT OFFICE 2,303,115

SELF-SYNCHRONIZING SYSTEM

Frank L. Eidmann, Princeton, George C. Engel, Ridgewood, and Adolph Amend, Jr., Hoboken, N. J., assignors to General Time Instruments Corporation, New York, N. Y., a corporation of Delaware Application June 21, 1939, Serial No. 280,244

6 Claims. (Cl. 172—293)

This invention relates to improvements in electric means for transmitting rotation and particularly to those means which are often referred to as alternating current self-synchronizing systems.

These systems in general comprise a generator and one or more reproducers, the rotating member, the rotation of which is to be transmitted, being coupled to the rotor of the generator, and the rotating members which reproduce the motion of the first rotating member, being coupled to the rotors of the self-synchronizing reproducers which may be located at a considerable distance from the generator and the stators of which are in circuit with the stator of the generator.

Actually, the generator is a transformer, the rotor being the primary and the stator the secondary. The stator comprises three or more windings in which are induced alternating currents, the effective voltages of which are determined by the position of the primary with respect to each particular secondary winding. As an example, one may take such a transformer having three secondary windings displaced from each other by 120 degrees, the neutral ends of the windings being connected together. If a sixty cycle voltage is impressed on the primary and the primary rotated five times per hour, on the three wires leading from the secondary will be found three sixty cycle per second voltages, the amplitudes of which periodically vary from positive maximum to zero to negative maximum according to the pattern of a three phase alternating current of five cycles per hour. Putting it another way, the transformer could be said to modulate a sixty cycle alternating current at the rate of five cycles per hour, the effective voltage of each wire varying in amplitude with respect to the voltages of the other wires in a three phase manner.

The three wires leading from the secondary of the rotary transformer given in the above example are connected to three self-synchronizing reproducer windings on the stator of each reproducer, the reproducer windings being positioned and connected to each other and to the three wire lines in the same manner as the three secondary windings of the rotary transformer. A resultant field is induced by the stator windings which rotates five times per hour, or which, one might say, rotates in synchronism with the primary of the rotary transformer.

It has been found, however, that the reproducer rotor, whether it be wound or unwound, will not rotate in exact synchronism with the five cycle per hour rotating field but that there is a periodic error of as much as plus or minus six degrees between the position of the reproducer rotor and synchronous position or the position of the transformer rotor. This error was found with a twelve-pole stator and was somewhat reduced by using a thirty-pole stator in both transformer and reproducer. The error is no doubt caused in part by the lack of an evenly distributed winding and may be reduced by increasing the number of poles or windings, although this is not practical from the standpoint of cost.

In many applications of such a self-synchronizing system, this periodic error detracts greatly from its value. If, for example, a secondary clock employing this system were to indicate the time first a minute slow and then a minute fast, it would be valueless.

We have found that this error may be greatly reduced by an improved rotor construction and the greatly reduced error may be still further reduced until of negligible extent by appropriate gear reduction between the reproducer rotor and the rotatable indicating or control means. Gear reduction to decrease the periodic error adds additional complications to a self-synchronous system, for if the maximum limits between which the rotors of the transformer and reproducer rotate exceeds 180 degrees in the case of an unwound rotor, or 360 degrees in the case of a wound rotor for the reproducer, accumulator means must be provided to insure that the reproducer rotor rotates through the same number of half or complete rotations as the generator rotor, even though no current is induced in the stator circuit due to interruption in the current supply to the generator rotor.

Consequently in applications of the system where the rotating member coupled to the transformer rotor does not change its position beyond maximum limits of 180 degrees or 360 degrees, the periodic error may best be reduced by the use of our improved rotor construction alone without gear reduction.

However, in certain applications, where the rotating member coupled to the transformer rotor rotates beyond 360 degrees or rotates continuously in one direction, accumulator means must be used even though the two are coupled in a one to one speed ratio. In these instances, gear reduction may well be used to reduce the periodic error for the accumulator means must be employed whether gear reduction is used or not. A secondary clock system is an example of these latter applications in which an accumulator is necessary and in this application it is desirable to employ both gear reduction and the above mentioned improved rotor construction to obtain the necessary accuracy. Consequently, our improved self-synchronizing system is described herein as applied to a clock system.

Although it has been previously proposed to move the hands of a secondary clock in a clock system by means of a self-synchronizing reproducer, it is well known that none of these clock systems possessed the necessary accuracy. Furthermore, the accumulator means, or means for resetting the hands after a current interruption required a very complex system often requiring two controls, a coarse and a fine control, and a separate self-synchronizing system for each. The cost of such a clock system prevented it from coming into general use for the ordinary inexpensive clock systems.

An object of our invention is to provide an improved alternating current self-synchronizing system having a high degree of accuracy.

A further object is to provide an improved self-synchronizing system for the transmission of rotation greater than 360 degrees.

A further object is to provide a simple and inexpensive electric system whereby rotation of one master unit may be reproduced in a large number of reproducer units positioned at considerable distances from the master unit.

A further object is to provide an improved three wire self-synchronizing system.

A further object is to provide a self-synchronized system which is adapted for incorporation in a secondary clock system.

A further object is to provide an inexpensive secondary clock system of simple construction and of positive efficient operation.

A further object is to provide an improved rotor construction for a self-synchronizing reproducer.

A further object is to provide an improved secondary clock system wherein the secondaries will correct themselves after a current interruption.

Figure 1:
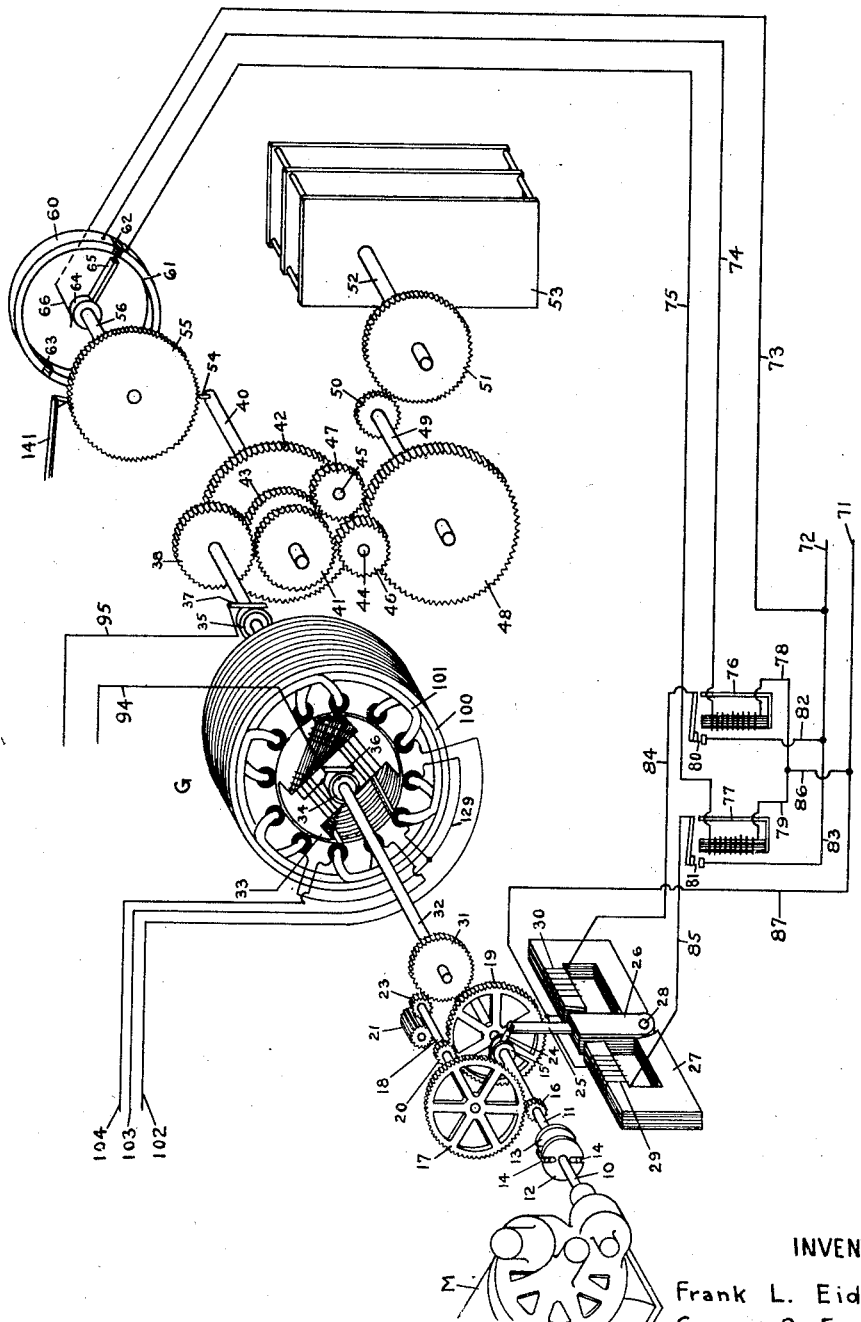
Figure 1 is a diagrammatic view of the transmitting unit, the elements being shown in perspective.

In Figure 1, reference numeral 10 indicates the shaft driven by motor M which is placed in an abutting relationship to and drives transmission shaft 11 through a coupling comprised of two disks 12 and 13 positioned at the end of each shaft, respectively, pins 14 being affixed to one disk and extending through slots in the other so that shaft 11 may move axially with respect to shaft 10. A collar 15 is mounted on shaft 11 which has an annular groove formed therein so that a laterally reciprocable member, 24, extending into the groove can engage the collar to displace the shaft one way or the other, the shaft being slidably mounted in suitable bearings not shown. A pinion 16 affixed to shaft 11 engages a wheel 17 on countershaft 18 and wheel 19 on shaft 11 is adapted to engage a pinion 20 on the countershaft when shaft 11 is displaced to the left, this displacement disengaging pinion and wheel 16 and 17. An idler 21 is mounted on a suitable idler shaft, not shown, so that it will be engaged by wheel 19 when the wheel and shaft are displaced to the right. The idler in turn engages a pinion 23 mounted on the countershaft and serves to reverse the rotation of the countershaft.

The pin 24 which engages the collar 15 is mounted on the arm 25 which extends upwardly from armature 26, the armature being associated with a core 27 and pivoted thereon at 28. Windings 29 and 30 each surround a separate branch of the core so that as one or the other is energized the transmission shaft 11 is displaced to the left or to the right. As shown in this embodiment, shaft 11 normally rotates at a speed of 120 revolutions per hour and the speed ratio between shaft 11 and countershaft 18, when the armature is in the normal or intermediate position, is six to one. When the armature is displaced in either direction the ratio is one to six so that the speed of rotation of the countershaft is normally twenty revolutions per hour but is increased to 720 revolutions per hour upon energization of either of the windings 29 and 30, the rotation in one instance being in the reversed direction.

A wheel 31 is mounted on rotor shaft 32 near one end thereof and engages pinion 23 on the countershaft so that the shaft is normally rotated five revolutions per hour, although when either of the windings are energized it will be driven at a speed of 180 revolutions per hour. Rotor 33 is mounted on shaft 32 and adjacent to the rotor at either end thereof are slip rings 34 and 35 with which are adapted to cooperate the brushes 36 and 37 which are mounted on the generator G. A gear wheel 38 is mounted at the opposite end of the shaft 32 from gear wheel 31.

The motor also drives one element of a differential which comprises a shaft 40 having idler wheels 41 and 42 mounted thereon on either side of a fixed wheel 43 which rotates with the shaft. Wheel 38 engages and drives idler 41. Mounted on idler 42 are two stub shafts 44 and 45 on which are mounted pinions 46 and 47, respectively. Pinions 46 and 47 are of greater width than wheels 41 and 43 so that pinions 46 and 47 will mesh with each other as well as with wheels 41 and 43, respectively. Wheel 48 drives the idler 42, the former wheel being mounted on a shaft 49 to which shaft is also affixed a pinion 50 which is driven by wheel 51 on clock shaft 52; the clock shaft forming a part of a continuously running master clock 53 which is here shown only diagrammatically. In the present embodiment master clock 53 is a so-called carryover clock, that is a spring driven clock which also has a synchronous electric motor associated therewith so that the speed of the clock is normally controlled by the synchronous motor but during current interruptions the speed is controlled by a balance wheel in the usual fashion. An example of such a clock wherein a synchronous motor oscillates one end of the hair spring of a clock, and thereby controls the frequency of the oscillations of the balance wheel is described in U. S. Patent No. 2,088,972. In this clock the main spring actually drives the clock at all times. In other types, the synchronous motor may drive the clock normally, means being provided to connect the spring driven clockwork to the clock during current interruptions. Such a clock of course will run at all times, whether the circuit to the synchronous motor is interrupted or not, and normally the operation of this clock is synchronized with the operation of the synchronous motor M which drives the rotor 33.

A single tooth pinion 54 is affixed to shaft 40 and engages a star wheel 55 which in turn is mounted on shaft 56 so that each rotation of the shaft 40 will rotate the star wheel by an amount equal to one tooth. A click, 141, is provided to prevent casual rotation of the star wheel during the time that the single tooth pinion is disengaged therefrom. Conducting segments 60 and 61, each approximating in outline a semicircle, are suitably positioned concentrically to shaft 56 and are insulated from each other by insulating segments 62 and 63. A slip ring 64 is mounted on, and insulated from shaft 56 and a wiper 65 extends from the slip ring and engages one of the conducting or insulating segments. A brush 66 is adapted to contact the slip ring.

Figure 2:
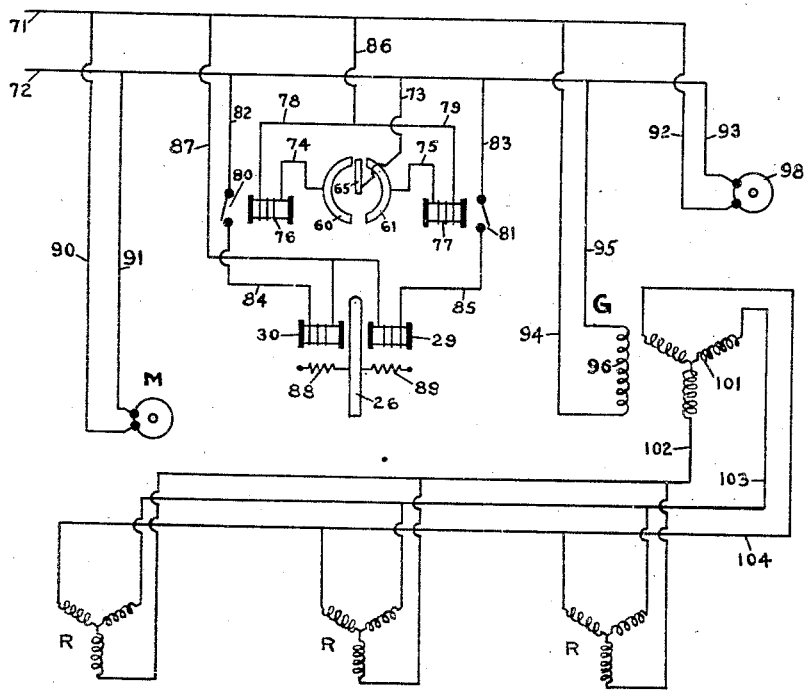
Figure 2 is a wiring diagram of the complete system.
Figure 3:
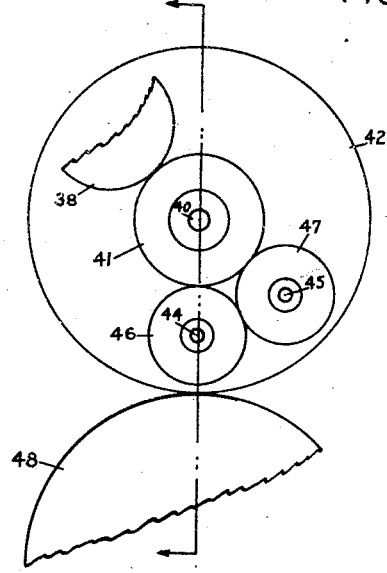
Figure 3 is an elevation of the differential unit shown in Figure 1.
Figure 4:
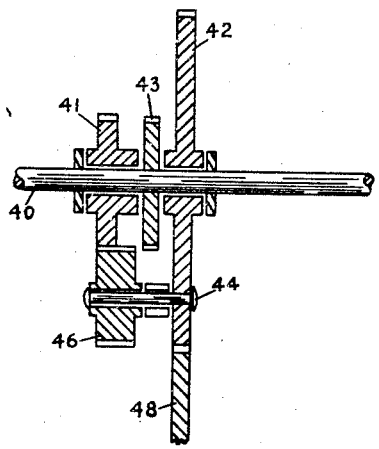
Figure 4 is a sectional elevation along line 4—4 of Figure 3.

With reference to Figures 1 and 2, which show the electrical circuits for the various elements above described, reference numerals 71 and 72 are A. C. lines. A conductor 73 extends between line 72 and wiper 65, and the conducting segments 60 and 61 are in series circuit with relays 76 and 77, respectively, through conductors 74 and 75. Conductors 78 and 79 extend from relays 76 and 77, respectively, to common conductor 86, and thence to A. C. line 71. Contacts 80 and 81 which are operated by relays 76 and 77 are placed between conductors 82, 84 and 83 and 85, respectively, the contacts being in circuit with windings 30 and 29, the energization of either of which will move the armature 26 in one direction or the other to control the operation of the transmission. Springs 88 and 89 extending from either side of armature 26 are suitably anchored in the frame work of the transmission so that when neither of the windings 30 or 29 are energized, the armature will remain in a neutral position which determines the normal operation of the transmitting unit. A common return conductor 87 extends from windings 30 and 29 to A. C. line 71.

Motor M is connected to the A. C. source of supply by conductors 90 and 91 and the synchronous motor 98 of the master clock is connected to said source by conductors 92 and 93. Conductors 94 and 95 lead from lines 71 and 72, respectively, to brushes 36 and 37, respectively, of the generator, so that winding 96 of the rotor may be energized by the standard sixty cycle A. C. current. The stator 100 of the generator is provided with coils 101 which are star connected and conductors 102, 103 and 104 lead from the star connected coils of the generator to similarly star connected coils of one or more reproducers R.

In normal operation, the motor M drives rotor 33 and idler 41 at a constant rate of speed, and the master clock drives idler 42 at a constant rate of speed, the speed ratio between idlers 41 and 42 being such that wheel 43 remains stationary and wiper 65 is at rest in contact with insulating segment 62.

If the master clock is set ahead manually, the action of the differential will cause wiper 65 to be rotated in the clockwise direction into contact with segment 61. A circuit will thereupon be established from line 72 through conductor 73, wiper 65, segment 61, conductor 75, relay 77, conductors 79 and 86 to line 71. Energization of relay 77 will establish a circuit from line 72 through conductor 83, relay contacts 81, conductor 85, magnet winding 29 and conductor 87 to line 71. Energization of electromagnet 29 will attract armature 26 and cause axial displacement of transmission shaft 11, disengaging pinion 16 from wheel 17 and engaging wheel 19 with pinion 20. This increases the speed ratio between the motor and the rotor shaft, thereby increasing the rotor speed and causing the reproducer rotors to catch up with the master clock. At the same time idler 41 is rotated at greater than normal speed; consequently the action of the differential will cause wiper 65 to be rotated in the counterclockwise direction back to its normal position thereby opening the above mentioned circuits and causing operation of the transmission at its normal speed ratio. At this time, the secondaries are again in synchronism with the master clock.

If the master clock is set back, wiper 65 will be rotated in the counterclockwise direction establishing a circuit from line 72 through conductor 73, wiper 65, segment 60, conductor 74, relay 76, conductors 78 and 86 to line 71. Energization of relay 76 will establish a circuit from line 72 through conductor 82, relay contacts 80, conductor 84, magnet winding 30, and conductor 87 to line 71. Energization of magnet 30 will attract armature 26 which will displace transmission shaft 11 to the right, disengaging pinion 16 from wheel 17 and engaging wheel 19 with idler pinion 21. This increases the speed ratio between the motor and the rotor shaft, but in the reverse direction, causing the hands of the secondary clocks to move backward until they are in agreement with the master clock, at which time wiper 65, by virtue of the increased speed of idler 41 in the reverse direction, will have rotated in the clockwise direction along segment 60 to its normal position in contact with insulating segment 62.

A current interruption has the same effect as setting the master clock ahead, for during the interruption the wiper is rotated in the clockwise direction, and upon resumption of the current supply the circuit conditions are similar to those described after the master clock has been set ahead.

Normally, the single tooth pinion 54 engages the star wheel 55 so that a slight angular displacement of wheel 43 and the single tooth pinion will be sufficient to throw the wiper off insulating segment 62 into contact with one of the conducting segments.

Inasmuch as the position of the wiper on either one of the conducting segments is immaterial, it is possible to employ intermittent motion transmission means between differential shaft 40 and wiper shaft 56 whereby a slight angular displacement of shaft 40 will cause the corrective mechanism to operate as above described, but further rotation of the shaft 40 will rotate shaft 56 at a much lower average speed ratio. If idler 41 is locked due to a current interruption, the master clock will drive shaft 40 through the differential, at a speed of five revolutions per hour, or sixty revolutions per 12 hours. Star wheel 55 is provided with sixty teeth, consequently it will rotate once every twelve hours during a current interruption. No matter at what time the current supply is resumed, or no matter how great the error between the master clock and the secondaries, the wiper will be in contact with one or the other of the conducting segments and effect correction of the secondaries. It will be further noted that if the error is greater than six hours, for instance, if the current interruption has lasted for ten hours, that the hands will move to indicate the correct time by the shortest route; in this instance the wiper will be in contact with segment 60 which will cause the hands to move backward to the extent of two hours rather than forward ten hours. Consequently, by the employment of the above described intermittent motion transmission means, we dispense with the coarse and fine controls of the prior art wherein the coarse control corrected for the number of whole revolutions of error and the fine control corrected for the fractional revolution of error or discrepancy between the generator rotor and the reproducer rotors. It is of course, obvious that this feature of our invention is useful in other applications of self-synchronizing systems than the corrective clock system herein shown.

As shown in Figure 2, motor M is a self-starting synchronous motor and the master clock is provided with a self-starting synchronous clock motor 98. In this embodiment it is assumed that lines 71 and 72 are provided with A. C. of a regulated frequency. Consequently the two motors are synchronized with respect to each other, and as the motor 98 controls the speed of the master clock, there would be no need for correction during normal operation. If the A. C. is not of regulated frequency, however, the master clock may be of any type which keeps accurate time, and motor M may be any type of motor. In this instance, as the motor M and the secondary clocks fall behind or advance with respect to the master clock, correction will occur more frequently. The more nearly the motor M approaches a constant speed motor, provided it is geared down so that the rotor is rotated at the proper speed ratio with respect to the master clock shaft 52, the less frequently will correction occur. It will therefore be noted that this system may be used whether the A. C. supply is regulated or not. The A. C. for energization of rotor 33 need not be regulated, but if D. C. only is available, a converter or interrupter must be used.

Because of the fact that an interruption in the current supply for rotor 33 will render the reproducers inoperative, it is essential that the rotation of the rotor cease within half a revolution after said current interruption, and to accomplish this, the motor and the rotor may be energized by the same source of current supply, or if this is not practicable, a relay in the rotor supply circuit may be provided to control the motor supply circuit accordingly.

Figure 7:
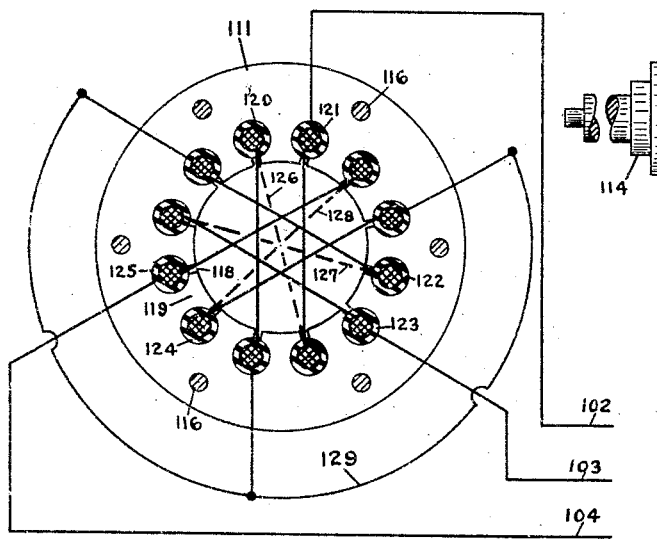
Figure 7 is a sectional elevation of a reproducer stator, a wiring diagram being superimposed upon the elevation; and, Figure 8 is an elevation of a complete secondary clock embodying the reproducer unit.
Figure 5:
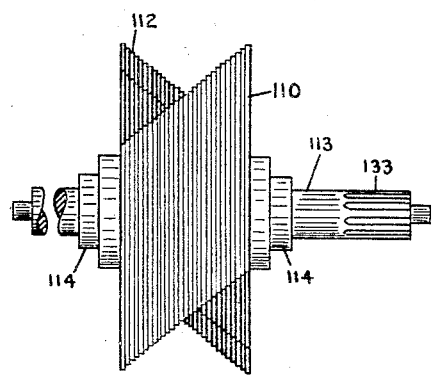
Figure 5 is an elevation of a reproducer rotor.
Figure 6:
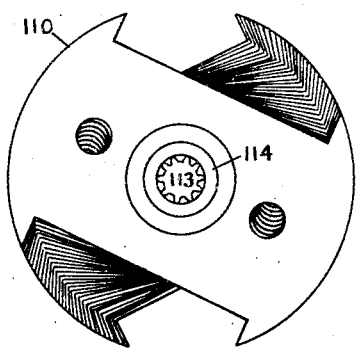
Figure 6 is a side elevation of a reproducer rotor.

The generator is essentially the same in construction as the reproducer which is shown in detail in Figures 5, 6 and 7 with the exception that the rotor of the former is wound and is provided with the necessary slip rings and brushes, all of which may be dispensed with in the reproducer. The generator, furthermore, is somewhat larger in size than the several reproducers.

The reproducer rotor 110 in Figure 6 is comprised of a plurality of laminations 112 rigidly associated with the shaft 113 in the customary manner by means of collars 114. Although the laminations are of the same shape and size, each one is angularly displaced from its adjacent laminations so that the rotor as a whole is skewed.

Figure 8:
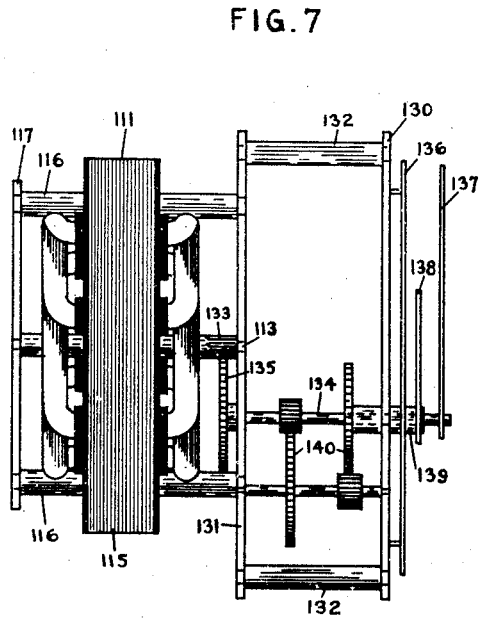

The stator 111 in Figures 7 and 8 is also composed of a plurality of laminations, 115, which are held together by studs 116. Frame plate 117 and 131 in which rotor shaft 113 is journaled, are associated with the stator laminations by the studs 116 as shown in Figure 8. The stator is slotted as at 118 to form twelve poles 119, and six coils 120 to 125 are positioned in the slots, the construction of the stator and the coil connections being the same as those of a star connected alternator.

As indicated in Figure 7, in which the wiring diagram is superimposed upon a section of the stator taken between two adjacent laminations, the coils are paired, each member of a pair being in series with the other, coils 120 and 121, coils 122 and 123, and coils 124 and 125 being connected by conductors 126, 127 and 128, respectively. The free end of coils 121, 123 and 125 are connected to lines 102, 103 and 104, respectively, and the free end of coils 120, 122 and 124 are connected together by neutral wire 129.

If the rotor were provided with a straight edge, or one parallel to a slot 118, the rotor would not come to rest at a position wherein its edge would be opposite a slot as this would increase the air gap, and this tendency to avoid such a position is a cause of an error in the positioning of the reproducer rotor, the error herein being referred to as the "periodic error" because of its periodic occurrence as the rotor is caused to rotate through 360 degrees. Skewing the rotor has the effect of eliminating in large part the periodic error for there is no unstable position of the rotor with respect to the slot. Furthermore, with respect to the generator, the skewed rotor serves to distribute the flux of the primary more evenly throughout the stator with the result that the strength of the primary field cutting each coil progressively increases from a minimum at those points in the stator which are intersected by the axis of the primary coil to a maximum at those points 90 degrees therefrom. Therefore, if each coil has an equal number of turns, the voltage and current induced in each coil increases as the axis of each secondary coil approaches parallelism with the axis of the primary coil, the increase being gradual as the receding skewed edge intersects each slot and causes more of the primary flux to be diverted around the coil in that particular slot rather than being shunted across the air gap of the slot.

The complete secondary clock is shown in Figure 8 and comprises front and rear plates 130 and 131, respectively, which are spaced from each other by pillars 132. Reproducer R is suitably mounted on the rear plate which also comprises one of the frame plates of the reproducer. Rotor shaft 113 is suitably journaled in the reproducer frame plates 117 and 131, terminating in a pinion 133. Minute shaft 134 is suitably journaled in the front and rear plates and carries wheel 135 engaged by pinion 133 and by means of which the minute shaft is driven by the rotor shaft in a 1 to 5 ratio. A dial 136 is associated with the front plate and hands 137 and 138 cooperate with the dial in the usual manner, minute hand 137 being affixed to shaft 134 and hour hand 138 being affixed to sleeve 139 which is associated with the minute shaft by appropriate reduction gearing 140.

Any periodic error that is not corrected by the skewed rotor construction will be negligible in extent as it appears on the clock face due to the reduction gearing between the rotor shaft and the minute shaft.

Various other modifications and changes in the circuits and wiring, and in the apparatus above described, as well as changes in the sizes and proportions of the parts thereof, which will occur to those skilled in the art, may be effected without departing from the spirit of our invention, as defined by the following claims, and all statements regarding the operation of our invention are intended to be illustrative only and not limitations on the said claims.

We claim:

1. In a self-synchronizing system, a generator and reproducers in circuit therewith, means for driving said generator, control means, a differential one element of which is associated with said generator and another element of which is associated with said control means, means actuated by said differential for regulating the speed at which said generator is driven, said latter means including the group comprising a brush and a commutator, intermittent motion transmission means for associating said differential with one element of said group, said commutator comprising two conducting segments separated by an insulating segment, a circuit including said brush and one of said conducting segments and means for increasing the speed at which said generator is driven in the forward direction, a circuit including said brush and the other of said conducting segments and means for reversing the direction of rotation of said generator, an initial rotation of slight extent of said differential in either direction from a neutral position causing relative rotation of said brush at a predetermined rate of speed from a neutral position in contact with said insulating segment to a position in contact with one or the other of said conducting segments, and further rotation of said differential causing relative rotation of said brush at a lower average rate of speed.

2. A self-synchronizing system comprising a first member, the rotation of which is to be reproduced by a second member, a self-synchronizing generator and a reproducer in circuit with said reproducer, driving means for said generator, a differential driven by said driving means and by said first member, control means associated with said differential for regulating the speed at which said generator and said differential are driven by said driving means, said generator normally being rotated at a higher rate of speed than said first member, and speed reducing means positioned between said reproducer and said second member whereby any periodic angular error obtaining between said generator and said reproducer will be reduced in extent in between said first member and said second member.

3. A self-synchronizing system comprising a rotatable control member, a master generator having a rotor, means for driving said rotor in either direction, a differential one element of which is associated with said master generator and another element of which is associated with said control member, means associated with said differential for regulating the rotation of said rotor in either direction, a self-synchronizing reproducer in circuit with said master generator, a driven rotatable member associated with said reproducer, speed increasing means between said control member and said differential and corresponding speed reduction means between said reproducer and said driven rotatable member whereby said speed increasing and decreasing means reduce any error between said rotatable control member and said driven rotatable member which is caused by the periodic error between said master generator and said reproducer.

4. A self-synchronizing system comprising a generator, a plurality of reproducers in circuit therewith, driving means for said generator, means for increasing the absolute speed of said generator in either the forward or reverse directions, two electromagnets, an armature common to both and adapted to be moved by the energization of either of said electromagnets, said armature being associated with said speed increasing means to actuate the same, independent circuits for said electromagnets, a rotatable control member, differential means responsive to the rotation of both said control member and said generator for registering correspondence of position or positive or negative difference between the actual position of said generator and the position thereof corresponding to the actual position of said control member, and automatic switching means actuated by said differential means when a positive or negative difference is registered for selectively completing one or the other of said independent circuits.

5. A self-synchronizing system comprising a master device, a rotatable member, means responsive to differences in the corresponding speeds of said master device and said rotatable member for regulating the speed of said rotatable member, said means including intermittent motion transmission means for causing increased sensitivity to the initial difference in the said corresponding speeds, a plurality of secondary devices, and means for causing synchronous operation of said secondary devices with respect to said rotatable member.

6. A self-synchronizing system comprising a synchronous motor, a master generator driven thereby, a differential comprising two driven elements and one driving element, one of said driven elements being associated with said master generator, a master device associated with said other driven element, and a two segment commutator associated with said driving element, speed changing means positioned between said synchronous motor and said master generator, a brush for cooperation with said commutator, electrical means for controlling the action of said speed changing means, an electric circuit including said commutator, brush and electrical control means, and a plurality of self-synchronizing reproducers in circuit with said master generator.

FRANK L. EIDMANN.
GEORGE C. ENGEL.
ADOLPH AMEND, Jr.